US007020200B2

(12) United States Patent
Winger

(10) Patent No.: US 7,020,200 B2
(45) Date of Patent: Mar. 28, 2006

(54) SYSTEM AND METHOD FOR DIRECT MOTION VECTOR PREDICTION IN BI-PREDICTIVE VIDEO FRAMES AND FIELDS

(75) Inventor: Lowell Winger, Waterloo (CA)

(73) Assignee: LSI Logic Corporation, Milpitas, CA (US)

( * ) Notice: Subject to any disclaimer, the term of this patent is extended or adjusted under 35 U.S.C. 154(b) by 689 days.

(21) Appl. No.: 10/217,142

(22) Filed: Aug. 13, 2002

(65) Prior Publication Data

US 2004/0032907 A1 Feb. 19, 2004

(51) Int. Cl.
*H04N 7/12* (2006.01)

(52) U.S. Cl. ................................................ 375/240.16

(58) Field of Classification Search ....................... 375/240.12–240.17; 348/416.1, 699–700; 382/238, 382/236; 386/109, 111

See application file for complete search history.

(56) References Cited

U.S. PATENT DOCUMENTS

| | | | | |
|---|---|---|---|---|
| 4,982,285 | A | 1/1991 | Sugiyama | |
| 4,985,768 | A | 1/1991 | Sugiyama | |
| 5,113,255 | A | 5/1992 | Nagata et al. | |
| 5,132,792 | A | 7/1992 | Yonemitsu et al. | |
| 5,193,004 | A | 3/1993 | Wang et al. | |
| 5,247,363 | A * | 9/1993 | Sun et al. | 348/616 |
| 6,236,960 | B1 | 5/2001 | Peng et al. | |
| 6,339,618 | B1 * | 1/2002 | Puri et al. | 375/240.16 |
| RE38,564 | E * | 8/2004 | Eifrig et al. | 382/236 |
| 2003/0099292 | A1 * | 5/2003 | Wang et al. | 375/240.12 |
| 2003/0099294 | A1 * | 5/2003 | Wang et al. | 375/240.15 |
| 2003/0202590 | A1 * | 10/2003 | Gu et al. | 375/240.13 |

* cited by examiner

*Primary Examiner*—Vu Le
(74) *Attorney, Agent, or Firm*—Christopher P. Maiorana PC

(57) ABSTRACT

The present invention is a low complexity method for reducing the number of motion vectors required for bi-predictive frames or fields in digital video streams. The present invention utilizes the motion vectors located in the corner blocks of a co-located macroblock, rather than all motion vectors, when determining the motion vectors of a current block. This results in reduced resources in the computation of direct motion vectors for a bi-predictive frame or field.

27 Claims, 4 Drawing Sheets

SYSTEM AND METHOD FOR DIRECT MOTION VECTOR PREDICTION IN BI-PREDICTIVE VIDEO FRAMES AND FIELDS

FIELD OF THE INVENTION

The present invention relates generally to systems and methods for the compression of digital video. More specifically, the present invention relates to a low-complexity method for reducing the file size or the bit rate of digital video produced by using bi-predicted frames and/or fields.

BACKGROUND OF THE INVENTION

Throughout this specification we will be using the term MPEG as a generic reference to a family of international standards set by the Motion Picture Expert Group. MPEG reports to sub-committee 29 (SC29) of the Joint Technical Committee (JTC1) of the International Organization for Standardization (ISO) and the International Electro-technical Commission (IEC).

Throughout this specification the term H.26x will be used as a generic reference to a closely related group of international recommendations by the Video Coding Experts Group (VCEG). VCEG addresses Question 6 (Q.6) of Study Group 16 (SG16) of the International Telecommunications Union Telecommunication Standardization Sector (ITU-T). These standards/recommendations specify exactly how to represent visual and audio information in a compressed digital format. They are used in a wide variety of applications, including DVD (Digital Video Discs), DVB (Digital Video Broadcasting), Digital cinema, and videoconferencing.

Throughout this specification the term MPEG/H.26x will refer to the superset of MPEG and H.26x standards and recommendations.

There are several existing major MPEG/H.26x standards: H.261, MPEG-1, MPEG-2/H.262, MPEG-4/H.263. Among these, MPEG-2/H.262 is clearly most commercially significant, being sufficient in many applications for all the major TV standards, including NTSC (National Standards Television Committee) and HDTV (High Definition Television). Of the series of MPEG standards that describe and define the syntax for video broadcasting, the standard of relevance to the present invention is the draft standard ITU-T Recommendation H.264, ISO/IEC 14496-10 AVC, which is incorporated herein by reference and is hereinafter referred to as "MPEG-AVC/H.264.

A feature of MPEG/H.26s is that these standards are often capable of representing a video signal with data roughly $1/50^{th}$ the size of the original uncompressed video, while still maintaining good visual quality. Although this compression ratio varies greatly depending on the nature of the detail and motion of the source video, it serves to illustrate that compressing digital images is an area of interest to those who provide digital transmission.

MPEG/H.26x achieves high compression of a video signal through the successive application of four basic mechanisms:

1) Storing the luminance (black & white) detail of the video signal with more horizontal and vertical resolution than the two chrominance (colour) components of the video.
2) Storing only the changes from one video frame to another, instead of the entire frame. This results in often storing motion vector symbols indicating spatial correspondence between frames.
3) Storing the changes with reduced fidelity, as quantized transform coefficient symbols, to trade-off a reduced number of bits per symbol with increased video distortion.
4) Storing all the symbols representing the compressed video with entropy encoding, to reduce the number of bits per symbol without introducing any additional video signal distortion.

The present invention relates to mechanism 2). More specifically it addresses the need of reducing the size of motion vector symbols.

SUMMARY OF THE INVENTION

The present invention relates to reducing the file size for bi-predicted frames in an MPEG video stream.

One aspect of the present invention is directed to a method for reducing the size of bi-predicted frames in an MPEG video stream, the method comprising the steps of:

a) determining a corner block of a macroblock; and
b) mapping the motion vectors of the corner block to blocks adjacent to the corner block.

In another aspect of the present invention there is provided a system for reducing the size of bi-predicted frames in an MPEG video stream, the system comprising:

a) means for determining a corner block of a macroblock; and
b) means for mapping the motion vectors of the corner block to blocks adjacent to said corner block.

DETAILED DESCRIPTION OF THE INVENTION

Figure 1:
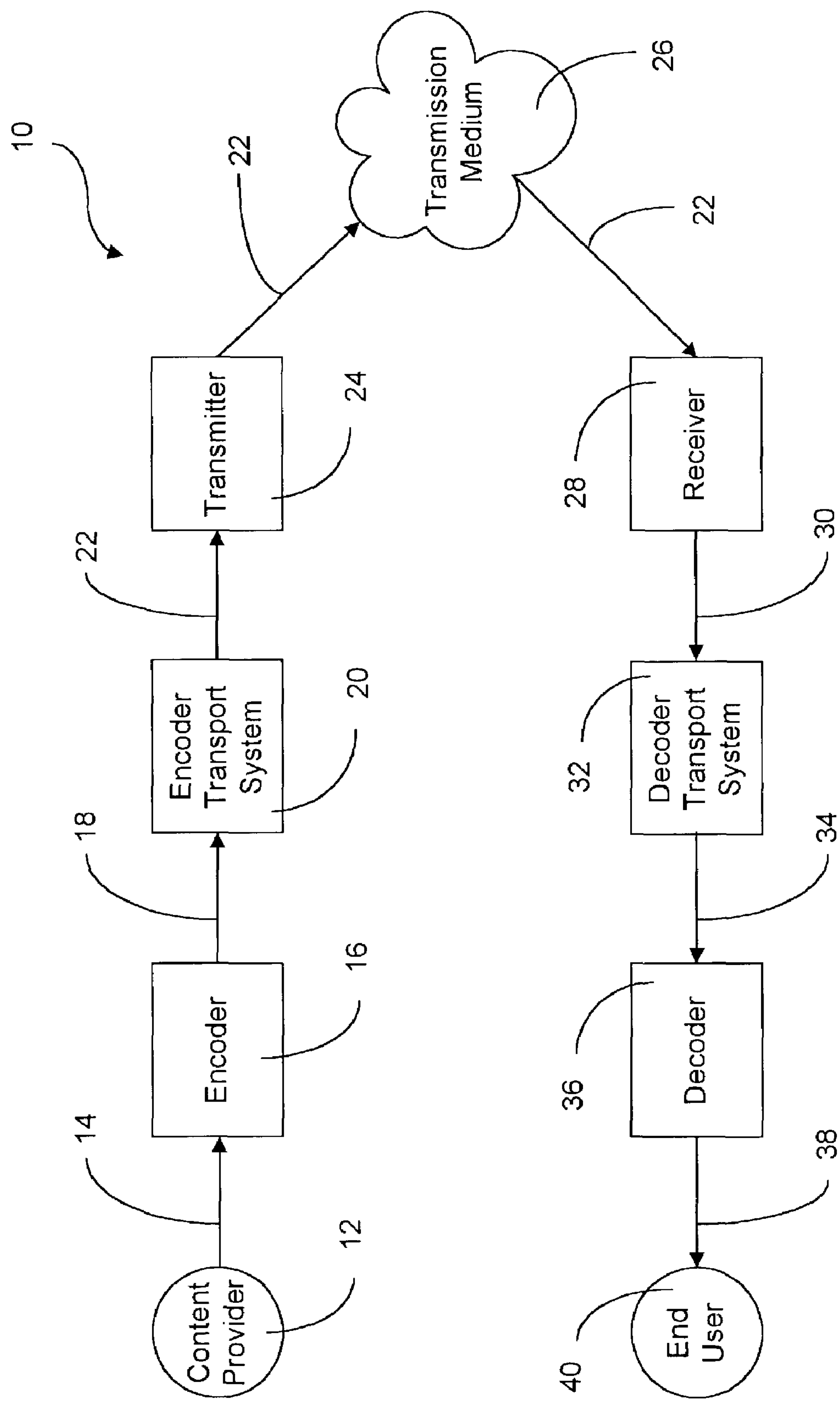
FIG. 1 is a block diagram of a video transmission and receiving system.

By way of introduction we refer first to FIG. 1, a video transmission and receiving system, is shown generally as 10. A content provider 12 provides a video source 14 to an encoder 16. A content provider may be anyone of a number of sources but for the purpose of simplicity one may view video source 14 as originating from a television transmission, be it analog or digital. Encoder 16 receives video source 14 and utilizes a number of compression algorithms to reduce the size of video source 14 and passes an encoded stream 18 to encoder transport system 20. Encoder transport system 20 receives stream 18 and restructures it into a transport stream 22 acceptable to transmitter 24. Transmitter 24 then distributes transport stream 22 through a transport medium 26 such as the Internet or any form of network enabled for the transmission of MPEG data streams. Receiver 28 receives transport stream 22 and passes it as received stream 30 to decoder transport system 32. In a perfect world, steams 22 and 30 would be identical. Decoder transport system 32 processes stream 30 to create a decoded stream 34. Once again, in a perfect world streams 18 and 34 would be identical. Decoder 36 then reverses the steps applied by encoder 16 to create output stream 38 that is delivered to the user 40.

Figure 2:
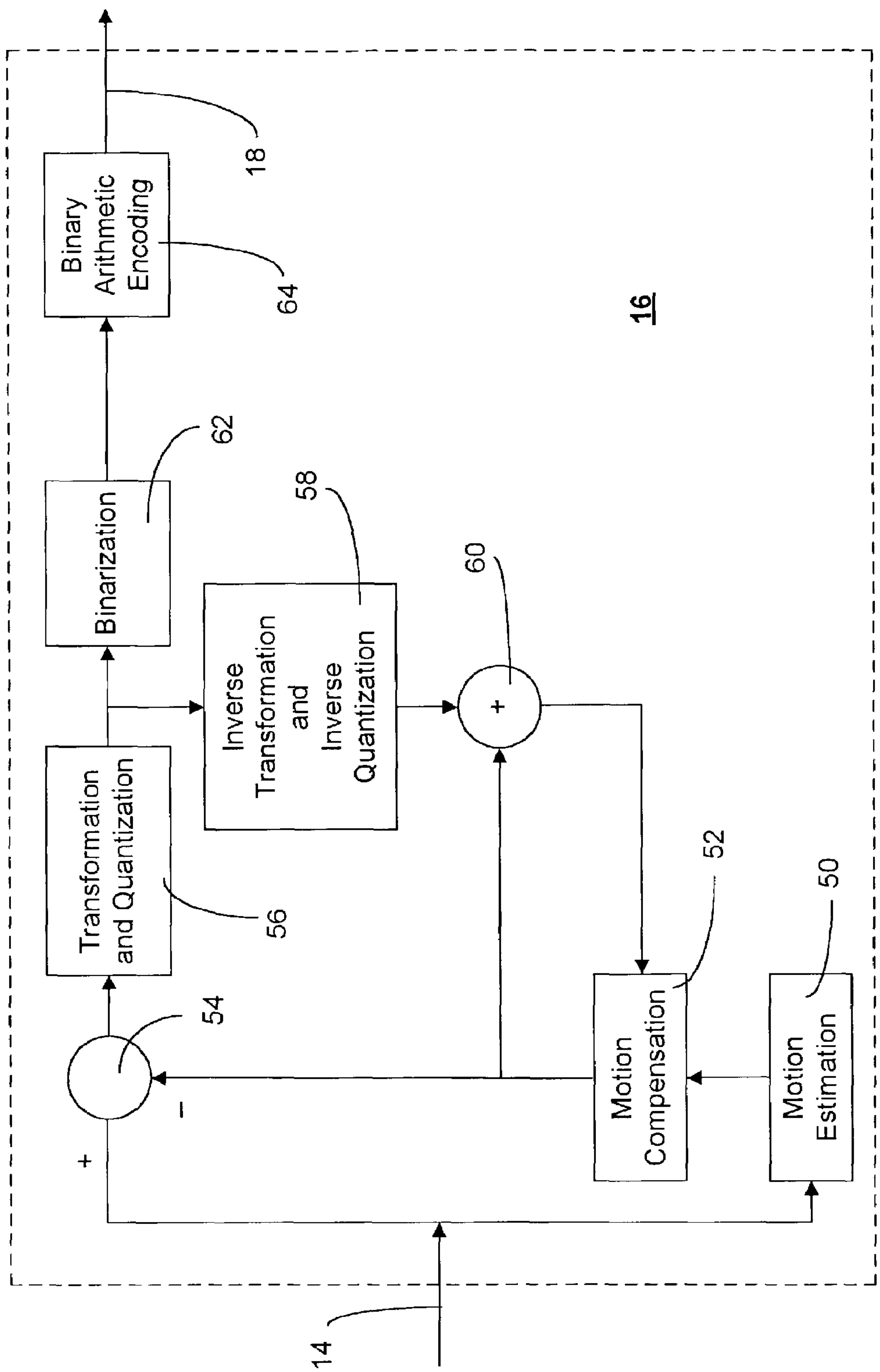
FIG. 2 is a block diagram of an encoder.

Referring now to FIG. 2 a block diagram of an encoder is shown generally as 16. Encoder 16 accepts as input video source 14. Video source 14 is passed to motion estimation module 50, which determines the motion difference between frames. The output of motion estimation module 50 is passed to motion compensation module 52. Motion compensation module 52 is where the present invention resides. At combination module 54, the output of motion compensation module 52 is subtracted from the input video source 14 to create input to transformation and quantization module 56. Output from motion compensation module 52 is also provided to module 60. Module 56 transforms and quantizes output from module 54. The output of module 56 may have to be recalculated based upon prediction error, thus the loop comprising modules 52, 54, 56, 58 and 60. The output of module 56 becomes the input to inverse transformation module 58. Module 58 applies an inverse transformation and an inverse quantization to the output of module 56 and provides that to module 60 where it is combined with the output of module 52 to provide feedback to module 52.

With regard to the above description of FIG. 2, those skilled in the art will appreciate that the functionality of the modules illustrated are well defined in the MPEG family of standards. Further, numerous variations of modules of FIG. 2 have been published and are readily available.

An MPEG video transmission is essentially a series of pictures taken at closely spaced time intervals. In the MPEG/H.26x standards, a picture is referred to as a "frame". Each frame of video sequence can be encoded as one of two types—an Intra frame or an Inter frame. Intra frames (I frames) are encoded in isolation from other frames, compressing data based on similarity within a region of a single frame. Inter frames are coded based on similarity a region of one frame and a region of a successive frames.

In its simplest form, an inter frame can be thought of as encoding the difference between two successive frames. Consider two frames of a video sequence of waves washing up on a beach. The areas of the video that show the sky and the sand on the beach do not change, while the area of video where the waves move does change. An inter frame in this sequence would contain only the difference between the two frames. As a result, only pixel information relating to the waves would need to be encoded, not pixel information relating to the sky or the beach.

An inter frame is encoded by generating a predicted value for each pixel in the frame, based on pixels in previously encoded frames. The aggregation of these predicted values is called the predicted frame. The difference between the original frame and the predicted frame is called the residual frame. The encoded inter frame contains information about how to generate the predicted frame utilizing the previous frames, and the residual frame. In the example of waves washing up on a beach, the predicted frame is the first frame, and the residual frame is the difference between the two frames.

In the MPEG-AVC/H.264 standard, there are two types of inter frames: predictive frames (P frames) are encoded based on a predictive frame created from one or more frames that occur earlier in the video sequence. Bi-directional predictive frames (B frames) are based on predictive frames that are generated from frames either earlier or later in the video sequence.

Figure 3:
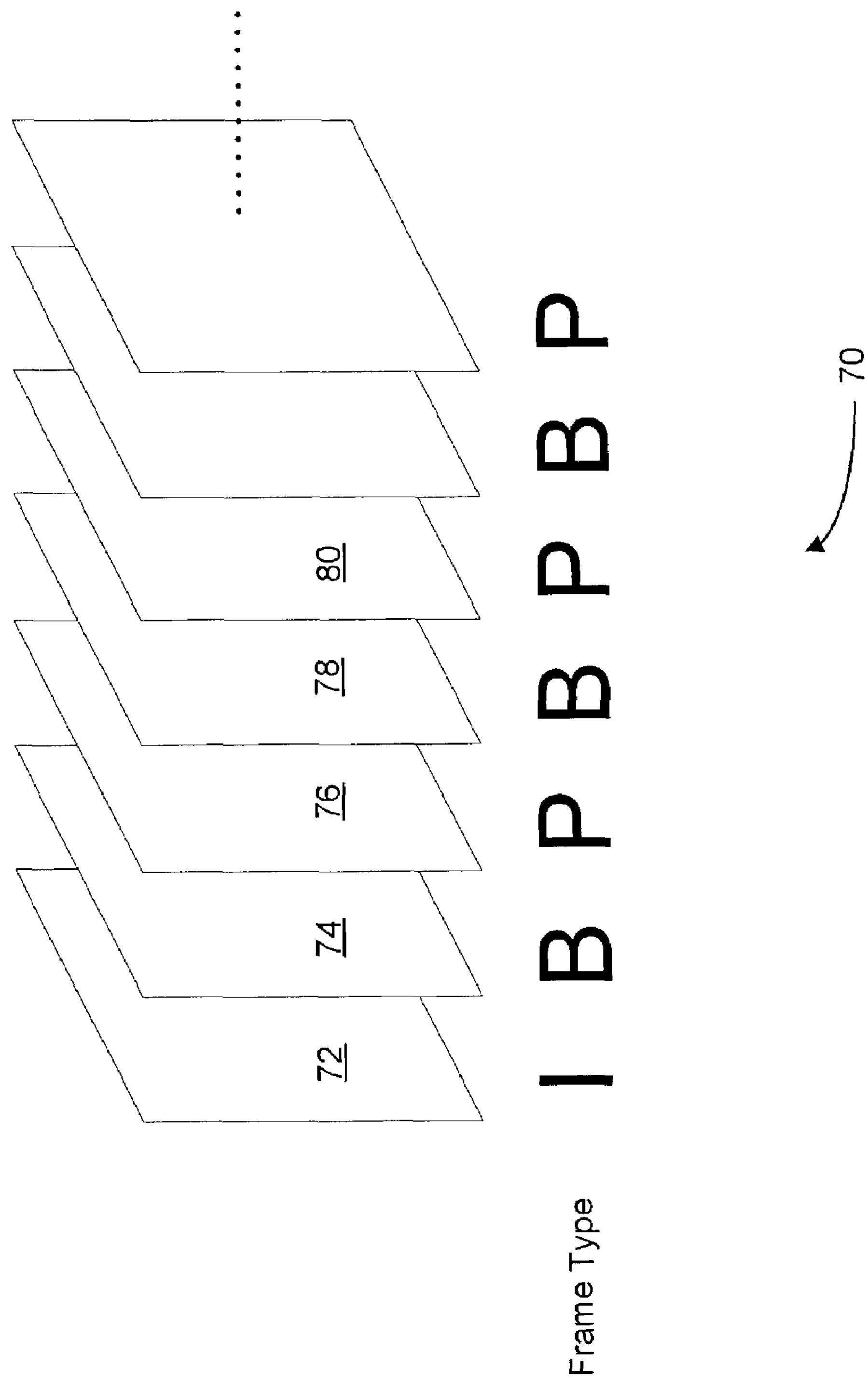
FIG. 3 is a schematic diagram of a sequence of video frames.

FIG. 3 shows a typical frame type ordering of a video sequence shown generally as 70. P frames are predicted from earlier P or I frames. In FIG. 3, third frame 76 would be predicted from first frame 72. Fifth frame 80 would be predicted from frame 76 and/or frame 72. B frames are predicted from earlier and later I or P frames. For example, frame 74 being a B frame, can be predicted from frame 72 and frame 76.

A frame may be spatially sub-divided into two interlaced "fields". In an interlaced video transmission, a "top field" comes from the even lines of the frame. A "bottom field" comes from the odd lines of the frame. For video that is captured in interlaced format, it is the fields, not the frames, which are regularly spaced in time. That is, these two fields are temporally subsequent. A typical interval between successive fields is $1/60^{th}$ of a second, with top fields temporally prior to bottom fields.

Either the entire frame, or the individual fields are completely divided into rectangular sub-partitions known as "blocks", with associated "motion vectors". Often a picture may be quite similar to the one that precedes it or the one that follows it. For example, a video of waves washing up on a beach would change little from picture to picture. Except for the motion of the waves, the beach and sky would be largely the same. Once the scene changes, however, some or all similarity may be lost. The concept of compressing the data in each picture relies upon the fact that many images often do not change significantly from picture to picture, and that if they do the changes are often simple, such as image pans or horizontal and vertical block translations. Thus, transmitting only block translations (known as "motion vectors") and differences between blocks, as opposed to the entire picture, can result in considerable savings in data transmission. The process of reconstructing a block by using data from a block in a different frame or field is know as "motion compensation".

Usually motion vectors are predicted, such that they are represented as a difference from their predictor, known as a predicted motion vector residual. In practice, the pixel differences between blocks are transformed into frequency coefficients, and then quantized to further reduce the data transmission. Quantization allows the frequency coefficients to be represented using only a discrete number of levels, and is the mechanism by which the compressed video becomes a "lossy" representation of the original video. This process of transformation and quantization is performed by an encoder.

In recent MPEG/H.26x standards, such as MPEG-AVC/H.264 and MPEG-4/H.263, various block-sizes are supported for motion compensation. Smaller block-sizes imply that higher compression may be obtained at the expense of increased computing resources for typical encoders and decoders.

Usually motion vectors are either:

a) spatially predicted from previously processed, spatially adjacent blocks; or b) temporally predicted, from spatially co-located blocks, in the form of previously processed fields or frames.

Actual motion may then optionally be represented as a difference, known as a predicted motion vector residual, from its predictor. Recent MPEG/H.26x standards, such as the MPEG-AVC/H.264 standard, include "block modes" that identify the type of prediction that is used for each predicted block. There are two such block modes namely:

1) Spatial prediction modes which are identified as "intra" modes which require "intra-frame/field" prediction. Intra-frame/field prediction is prediction only between picture elements within the same field or frame.

2) Temporal prediction modes, are identified as "inter" modes. Temporal prediction modes make use of motion vectors. Thus they require "inter-frame/field" prediction.

Inter-frame/field prediction is prediction between frames/fields at different temporal positions.

Currently, the only type of inter mode that use temporal prediction of the motion vectors themselves is the "direct" mode of MPEG-AVC/H.264 and MPEG-4/H.263. In these modes, the motion vector of a current block is taken directly from the co-located block in a temporally subsequent frame/field. A co-located block has the same vertical and horizontal co-ordinates of the current block, but is in the subsequent frame/field. In other words, a co-located block has the same spatial location as the current block. No predicted motion vector residual is coded for direct mode, rather the predicted motion vector is used without modification. Because the motion vector comes from a temporally subsequent frame/field, that frame/field must be processed prior to the current/field. Thus, processing of the video from its compressed representation is done temporally out of order. In the case of P-frames and B-frames (see the description of FIG. 3), B-frames are encoded after temporally subsequent P-frames so that these B-frames may take advantage of simultaneous prediction from both temporally subsequent and temporally previous frames. With this structure, direct mode may be defined only for B-frames, since previously processed, temporally subsequent reference P-frames can only be available for B-frames.

As previously noted, small blocksizes typically require increased computing resources. The present invention defines the process by which direct-mode blocks in a "B-frame" derive their motion vectors from blocks of a "P-frame". This is achieved by combining the smaller motion compensated "P-frame" blocks to produce larger motion compensated blocks in a "direct-mode" B-frame block. Thus, it is possible to significantly reduce the system memory bandwidth required for motion compensation for a broad range of commercially important system architectures. Since the memory subsystem is a significant factor in video encoder and decoder system cost, a direct-mode that is defined to permit the most effective compression of typical video sequences, while increasing motion compensation block size can significantly reduce system cost.

Although it is typical that B-frames reference P-frames to derive motion vectors, it is also possible for the present invention to utilize B-frames to derive motion vectors.

The present invention derives motion vectors through temporal prediction between different video frames. This is achieved by combining the motion vectors of small blocks to derive motion vectors for larger blocks. This innovation permits lower-cost system solutions than prior art solutions such as that proposed in the joint model (JM) 1.9, of MPEG-AVC/H.264, in which blocks were not combined for the temporal prediction of motion vectors. A portion of the code for the prior solution follows:

```
void Get__Direct__Motion__Vectors ( )
{
int block__x, block__y, pic__block__x, pic__block__y;
int refframe, refP__tr, TRb, TRp, TRd;
for (block__y=0; block__y<4; block__y++)
{
    pic__block__y = (img->pix__y>>2) + block__y; ///*** old method
    for (block__x=0; block__x<4; block__x++)
    {
    pic__block__x = (img->pix__x>>2) + block__x; ///*** old method
```

In the above code sample the values of img->pix_y and img->pix_x indicate the spatial location of the current macroblock in units of pixels. The values of block_y and block_x indicate the relative offset within the current macroblock of the spatial location of each of the 16 individual 4×4 blocks within the current macroblock, in units of four pixels. The values of pic_block_y and pic_block_x indicate the spatial location of the co-located block from which the motion vectors of the current block are derived, in units of four pixels. The operator ">>2" divides by four thereby making the equations calculating the values of pic_block_y and pic_block_x use units of four pixels throughout.

Figure 4:
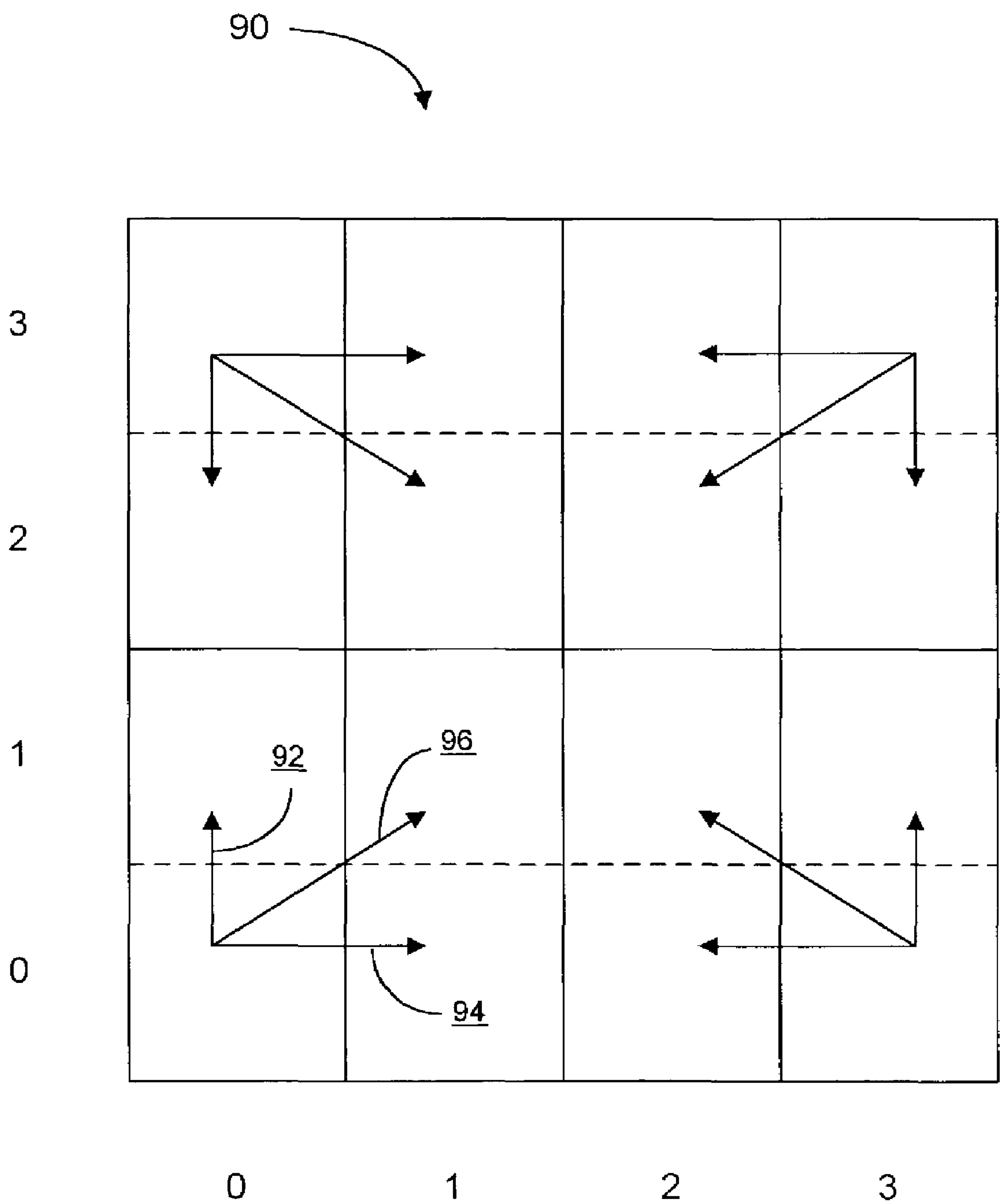
FIG. 4 is a block diagram of direct-mode inheritance of motion vectors from co-located blocks.

The variables pic_block_y and pic_block_x index into the motion vector arrays of the co-located temporally subsequent macroblock to get the motion vectors for the current macroblock. In the old code the variables pic_block_y and pic_block_x take values between 0 and 3 corresponding to the four rows and four columns of FIG. 4. FIG. 4 is a block diagram of direct-mode inheritance of motion vectors from co-located blocks and is shown generally as 90.

In the present invention, the variables pic_block_x and pic_block_y take only values 0 and 3, corresponding to the four corners of FIG. 4. Thus with the present invention, at most four different motion vectors are taken from the co-located macroblock, while with the old method up to sixteen different motion vectors could have been taken. The motion vector of block (0,0) is thus duplicated in blocks (0,1), (1,0) and (1,1) as indicated by arrows 92, 94 and 96 respectively. As a result the motion vectors for each corner block in a co-located macroblock become the motion vectors for a larger block in the current macroblock, in this case 4 larger blocks each being a 2×2 array of 4×4 pixel blocks.

The code for the present invention follows:

```
void Get__Direct__Motion__Vectors ( )
{
int block__x, block__y, pic__block__x, pic__block__y;
int refframe, refP__tr, TRb, TRp, TRd;
for (block__y=0; block__y<4; block__y++)
{
        pic__block__y = (img->pix__y>>2) + ((block__y>=2)?3:0);
    for (block__x=0; block__x<4; block__x++)
    {   pic__block__x = (img->pix__x>>2) + ((block__x>=2)?3:0);
    . . .
```

In the code for the prior example the spatial location of the co-located block (pic_block_x, pick_block_y) is identical to the spatial location of the current block, i.e:

((img->pix_x>>2)+block_x, (imp->pix_y>>2)+block_y)

In the code for the present invention, the spatial location of a co-located block is derived from the spatial location of the current block by forcing a co-located block to be one of the four corner blocks in the co-located macroblock, from the possible 16 blocks. This is achieved by the following equations:

*pick_block_x*=(*img*->*pix_x*>>2)+((*block_x*>=2)?3:0)

*pick_block_y*=(*img*->*pix_y*>>2)+((*block_y*>=2)?3:0)

Since each co-located macroblock has 2 motion vectors, this method also reduces the number of motion vectors from 32 to 8. By way of illustration Table 1 contains the mappings of blocks within a current macroblock to their position in a co-located macroblock. Table 1 shows the block offsets within a macroblock in units of four pixels, rather than the absolute offsets within the current frame for all blocks in the frame. In Table 1, the first column contains the value of a current block, determined by:

```
((img->pix_x>>2)+block_x), (img->pix_y>>2)
    +block_y);
```

the second column contains the value of the co-located block, determined by:

```
(pic_block_x, pic_block_y).
```

TABLE 1

Mapping from co-located blocks to current blocks

| Current Block | Co-located Block |
|---|---|
| (0, 0) | (0, 0) |
| (0, 1) | (0, 0) |
| (0, 2) | (0, 3) |
| (0, 3) | (0, 3) |
| (1, 0) | (0, 0) |
| (1, 1) | (0, 0) |
| (1, 2) | (0, 3) |
| (1, 3) | (0, 3) |
| (2, 0) | (3, 0) |
| (2, 1) | (3, 0) |
| (2, 2) | (3, 3) |
| (2, 3) | (3, 3) |
| (3, 0) | (3, 0) |
| (3, 1) | (3, 0) |
| (3, 2) | (3, 3) |
| (3, 3) | (3, 3) |

Although the present invention refers to blocks of 4×4 pixels and macroblocks of 4×4 blocks, it is not the intent of the inventors to restrict the invention to these dimensions. Any size of blocks within any size of macroblock may make use of the present invention, which provides a means for reducing the number of motion vectors required in direct mode for bi-predictive fields and frames.

Although the present invention has been described as being implemented in software, one skilled in the art will recognize that it may be implemented in hardware as well. Further, it is the intent of the inventors to include computer readable forms of the invention. Computer readable forms meaning any stored format that may be read by a computing device.

Although the present invention has been described with reference to certain specific embodiments, various modifications thereof will be apparent to those skilled in the art without departing from the spirit and scope of the invention as outlined in the claims appended hereto.

I claim:

1. A method for processing a video stream, comprising the steps of:

a) determining at least one motion vector for a corner block of a current macroblock from a block in a co-located macroblock decoded from said video stream;

b) mapping said motion vector to a plurality of neighbor blocks of said current macroblock adjacent to said corner block; and c) reconstructing said neighbor blocks based on said motion vector.

2. The method of claim 1, wherein said neighbor blocks comprise three blocks adjacent to said corner block.

3. The method of claim 2, further comprising the step of:

generating said video stream by decoding a transport stream, wherein (i) step b) comprises the sub-step of mapping two motion vectors from said at least one motion vector to each of said neighbor blocks, (ii) motion compensation for said corner block and said neighbor blocks is inferred in said video stream and (iii) said corner block comprises a four by four array of pixels.

4. The method of claim 1, wherein said steps a), b) and c) are performed for four blocks including said corner block, each located in a different corner of said current macroblock.

5. The method of claim 1, wherein step b) comprises the sub-step of:

mapping two motion vectors from said at least one motion vector to each of said neighbor blocks.

6. The method of claim 1, wherein said video stream is compliant with at least one of an International Organization for Standardization/International Electrotechnical Commission 14496-10 standard and an International Telecommunication Union-Telecommunications Standardization Sector Recommendation H.264 accounting for said mapping.

7. The method of claim 1, wherein said method performs a digital video decoding.

8. The method of claim 1, wherein motion compensation for said corner block and said neighbor blocks is inferred in said video stream.

9. The method of claim 1, wherein, motion compensation for said corner block and said neighbor blocks includes a prediction inferred in said video stream and a motion vector residual.

10. A system comprising:

means for (i) determining at least one motion vector for a corner block of a current macroblock from a block in a co-located macroblock decoded from a video stream; and (ii) mapping the said motion vector to a plurality of neighbor blocks of said current macroblock adjacent to said corner block; and means for reconstructing said neighbor blocks based on said motion vector.

11. The system of claim 10, wherein said neighbor blocks comprise three blocks adjacent to said corner block.

12. The system of claim 10, wherein said means for determining and mapping and said means for reconstructing are further configured to operate on four blocks including said corner block, each located in a different corner of said current macroblock.

13. The system of claim 10, wherein said current macroblock is a first field macroblock and said co-located macroblock is a second field macroblock.

14. The system of claim 10, wherein said current macroblock is a first frame macroblock and said co-located macroblock is a second frame macroblock.

15. The system of claim 10, wherein motion compensation for said corner block and said neighbor blocks is inferred in said video stream.

16. The system of claim 10, wherein motion compensation for said corner block and said neighbor blocks includes a prediction inferred in said video stream and a motion vector residual.

17. The system of claim 10, wherein said system forms a digital video decoder.

18. A method for processing a video stream, comprising the steps of:

a) determining at least one motion vector for a corner block of a current macroblock from a block in a co-located macroblock;

b) mapping said motion vector to a plurality of neighbor blocks of said current block adjacent to said corner block; and c) generating said video stream such that motion compensation for said corner block and said neighbor blocks is inferred.

19. The method of claim 18, wherein said neighbor blocks comprise three blocks of said current macroblock adjacent to said corner block.

20. The method of claim 18, wherein said steps a), b) and c) are performed for four blocks including said corner block, each located in a different corner of said current macroblock.

21. The method of claim 18, wherein said corner block comprises a four by four array of pixels.

22. The method of claim 18, wherein said video stream is compliant with at least one of an International Organization for Standardization/International Electrotechnical Commission 14496-10 standard and an International Telecommunication Union-Telecommunications Standardization Sector Recommendation H.264 accounting for said mapping.

23. The method of claim 18, wherein said method performs a digital video encoding.

24. The method of claim 18, further comprising the step of:

reconstructing said neighbor blocks based on said motion vector.

25. A system comprising:

means for (i) determining at least one motion vector for a corner block of a current macroblock from a block in a co-located macroblock and (ii) mapping said motion vector to a plurality of neighbor blocks of said current block adjacent to said corner block; and means for generating a video stream such that motion compensation for said corner block and said neighbor blocks is inferred.

26. The system of claim 25, wherein said video stream is compliant with at least one of an International Organization for Standardization/International Electrotechnical Commission 14496-10 standard and an International Telecommunication Union-Telecommunications Standardization Sector Recommendation H.264 accounting for said mapping.

27. The system of claim 25, wherein said system forms a digital video encoder.

* * * * *